United States Patent [19]

Roundy et al.

[11] Patent Number: 5,418,562
[45] Date of Patent: May 23, 1995

[54] METHOD AND APPARATUS FOR INCREASING THE ACCURACY OF DIMENSIONAL MEASUREMENTS MADE WITH VIDEO CAMERAS

[75] Inventors: Carlos B. Roundy; Gregory E. Slobodzian; Kurt Jensen, all of Logan, Utah

[73] Assignee: Spiricon, Inc., Logan, Utah

[21] Appl. No.: 78,082

[22] Filed: Jun. 15, 1993

Related U.S. Application Data

[63] Continuation-in-part of Ser. No. 60,575, May 11, 1993.

[51] Int. Cl.⁶ .................... H04N 5/21; H04N 17/00
[52] U.S. Cl. ................................ 348/175; 348/186; 348/193; 348/571
[58] Field of Search ............... 348/175, 184, 186, 187, 348/193, 162, 571, 618, 619, 622, 627; H04N 5/21, 17/00

[56] References Cited

U.S. PATENT DOCUMENTS

| | | | |
|---|---|---|---|
| 2,655,122 | 8/1956 | Adams | 116/1 |
| 4,303,943 | 12/1981 | May | 348/619 |
| 4,388,637 | 6/1983 | Blair | 348/184 |
| 4,523,229 | 6/1985 | Kanmoto | 348/619 |
| 4,539,936 | 9/1985 | Majewski | 49/460 |
| 4,855,829 | 8/1989 | Kiihara | 348/627 |
| 4,906,097 | 3/1990 | Wiedemann | 356/375 |
| 5,038,703 | 9/1991 | Frush | 116/170 |
| 5,144,430 | 9/1992 | Boelart | 348/184 |
| 5,172,216 | 12/1992 | Suzuki et al. | 348/184 |
| 5,198,900 | 9/1993 | Tsukagoshi | 348/384 |
| 5,223,932 | 6/1993 | Thomas et al. | 348/571 |
| 5,260,775 | 11/1993 | Farouda | 348/619 |

OTHER PUBLICATIONS

"Advanced Laser Beam Analyzer", Spiricon Laser Beam Diagnostics, Technical Date, May 1991.
Advanced Laser Beam Analyzer Model LBA-100A.

Primary Examiner—Tommy P. Chin
Assistant Examiner—Vu Le
Attorney, Agent, or Firm—Thorpe, North & Western

[57] ABSTRACT

Video cameras, such as charge coupled device cameras, are used for optically making dimensional measurements of laser beams. Such cameras have drawbacks including baseline offset error, shading error, pixel-to-pixel fixed pattern offsets, and poor signal-to-noise ratio. Methods and apparatus to correct for these errors, without losing any desired signal components, wherein the baseline offset error is corrected without the loss of any signal components that may otherwise be obscured due to noise. The baseline of the signal is raised above a digitizer's zero level, an average baseline without an input signal present is determined, and then the average baseline is subtracted from the subsequently obtained signals. The subtraction process is performed such that the subsequent frames in memory retain all negative signal components, as well as positive signal components, and thus there is no loss of the desired signal. Any subsequent quantitative measurements consider both the positive and negative signal components and thus measurements are made as accurately as possible. After the baseline error is corrected, one or more of a number of noise reduction methods are implemented to improve the signal-to-noise ratio.

31 Claims, 9 Drawing Sheets

METHOD AND APPARATUS FOR INCREASING THE ACCURACY OF DIMENSIONAL MEASUREMENTS MADE WITH VIDEO CAMERAS

RELATED APPLICATIONS

This application is a continuation-in-part of U.S. patent application Ser. No. 08/060,575 filed on May 11, 1993 entitled METHOD AND APPARATUS FOR IMPROVING DIMENSIONAL MEASUREMENTS MADE WITH VIDEO CAMERAS.

BACKGROUND

1. The Field of the Invention

This invention relates to devices and methods used to make dimensional measurements using video cameras. More particularly, the present invention relates to making dimensional measurements of a laser beam which are used to determine important parameters and characteristics of the laser beam.

2. The Background Art

A variety of video cameras accompanied by appropriate signal processing equipment are advantageously used to make quantitative dimensional measurements in scientific and industrial fields. For example, video cameras based upon charge coupled devices (CCD) and vidicon devices are commonly used to make dimensional measurements. Cameras based upon CCD and vidicon devices are rugged mechanisms with many desirable characteristics for use in making quantitative dimensional measurements.

Laser devices have become common in modern technology. A laser beam provides a source of highly concentrated optical energy which has found use in many diverse applications in research, medicine, and industry. The primary features that make a laser beam useful for such applications include, for example: a single wavelength or color, i.e., monochromatic light; collimation of the optical energy so that the laser beam travels in a narrow beam over a very long distance; the ability to concentrate large amounts of energy in a very short period of time; and, the ability to focus the laser beam to a very small spot.

The laser's capability to control the exact spot size and spatial distribution of laser beam energy is of critical importance in nearly all applications of lasers. In order to control the spot size and spatial distribution of laser beam energy it is necessary to measure the spatial energy profile, and in particular, the precise dimensions of the laser beam. It is only when accurate measurements of the spatial profile and dimensions of laser beams are possible that the performance and effectiveness of a laser beam can be significantly improved.

Video cameras using CCD (charge coupled devices), CID (charged injection devices), self-scanned arrays, vidicon tubes (video cameras using vidicon tubes sometimes being referred to as vidicon cameras) and other camera technologies have become widely used as part of a system to measure laser beam dimensions as well as to carry out other optical dimensional measurements. When using video cameras to measure laser beam parameters, the laser beam is directed to impinge upon the video camera's light sensitive surface and the video camera is able to record the spatial intensity profile of the laser beam over its entire two-dimensional matrix. The signal which is output from the video camera is then subjected to a video digitizer and appropriate digital signal processing hardware and software to provide laser beam parameter measurements.

The video cameras and associated signal processing equipment provide two principal functions when performing laser beam measurements. The first function is the ability to record and display the laser beam profile. Visualization or displaying of the laser beam profile assists a laser user by providing an intuitive feel for the results of quantitative measurements. The fast response of such video cameras and signal processing equipment can provide a display of laser beam profiles in real time and in both 2D and 3D modes.

The second function is to make quantitative measurements on laser beam parameters. Such laser beam parameters include total power, power density, and in particular, the width or diameter of the laser beam. These detailed quantitative measurements of laser beam characteristics allow a user to precisely determine the properties of the laser beam and to make incremental adjustments and improvements in its performance.

Video cameras using CCDs, hereinafter referred to as CCD cameras, in particular have become popular as a tool for conducting laser beam diagnostic measurements. The ability of the CCD camera to simultaneously measure the entire surface area of the laser beam and perform detailed spatial measurements makes it well suited for conducting laser beam diagnostics. These cameras are often used by scientists and engineers who are either designing lasers or who are using lasers in applications where the spatial profile of the laser beam is critical.

The before-mentioned video cameras, in spite of their advantages, possess certain characteristics that limit the precision with which laser beam diagnostics can be carried out. Still, some of the properties of CCD cameras make them well suited for spatial profile measurements of laser beams. These video cameras, however, have some characteristics that limit their usefulness in laser beam diagnostics and in other industrial quantitative measurement applications.

First, CCD cameras and vidicon cameras typically have a low signal-to-noise ratio, even when the signal is approaching saturation, which causes problems in obtaining precise measurements under varying camera conditions.

Second, some video cameras possess a measurement error resulting from a fixed baseline offset error inherent in the camera. The fixed baseline offset error exacerbates the seriousness of the low signal-to-noise ratio. It has been shown (Jones, R., *Laser Focus World*, January 1993) that a 1% error baseline offset error can contribute up to 20% error in the measured width of a laser beam. Moreover, fixed baseline offset can also come from signal processing equipment.

Third, some video cameras, and particularly CCD cameras and vidicon cameras, exhibit what is referred to as "shading error" in the baseline which results in the baseline offset changing from one portion of the spatial plane in the camera to another.

These inherent characteristics have limited the ability of some commercial grade video cameras to make accurate measurements. Generally, accurate measurements using video cameras is possible only when the signal produced by the camera is very close to saturation and only when the signal covers a relatively large area of the light sensitive surface in the video camera.

The problems encountered with video cameras such as CCD cameras and vidicon cameras are accentuated in laser beam diagnostics applications because the measured dimensions of the laser beam impinging upon the light sensitive surface of the camera is highly dependent upon the proper detection of low level beam intensities in the wings, or outer regions, of the laser beam where the signal-to-nose ratio of the video camera is inherently very low and may even be less than one. In contrast, the integrated total energy in the wings can be significant due to the relatively large area of the wings found in some laser beams. In cases where the wing portion of the laser beam is large or exhibits high energy the noise which is inherent in video cameras, especially in the presence of baseline offset error and shading errors, can create very large errors in calculated beam dimensions.

In addition to the above noted difficulties with video cameras, there are a number of different definitions for laser beam width which must be considered. Some of the definitions for laser beam width are useful for some types of laser beams, and other definitions are useful for other types of laser beams. Nevertheless, for a great majority of laser beams, many of the definitions have an equivalence to one another. Information on the equivalence of various definitions of laser beam width is available from Seagman, Johnston and Sassnet, "Choice of Clip Levels for Beam Width Measurements using Knife-Edge Technologies," *IEEE Journal of Quantum Electronics* (April 1991). The most useful of these definitions of laser beam width, and their accompanying methods, are known in the art and will be described below.

One fundamental approach to defining laser beam widths is based upon the second moments of the energy distribution in a two-dimensional intensity profile. This definition of laser beam width is referred to as the $D_{4\sigma}$ approach. However, the calculation of the $D_{4\sigma}$ beam widths is compromised due to the limitations of the recording devices, e.g., the videocameras and signal processing equipment. In particular, noise and baseline offset have a stronger effect on creating errors when using the second moment definition. Thus, other definitions of laser beam widths are used because they agree with the $d_{40}$ definition to within a high degree of accuracy under certain conditions and are less vulnerable to the limitations of the recording devices.

Another definition of beam width is called $D_{86}$ and is one in which all of the pixels which are measuring a signal in the beam are summed, starting at the highest magnitude, until 86% of the total energy impinging on the light sensitive surface of the video camera is counted. At this point, a diameter is calculated based upon the area containing those pixels which make up 86% of the total energy of the laser beam. Disadvantageously, the shape of the beam is assumed to be circular and only a single diameter is computed.

A third definition of laser beam width is called knife-edge. The knife-edge definition is one in which an equivalent knife-edge is drawn across the signal from the video camera until it cuts off 10% of the energy of the laser beam. The knife-edge continues to be drawn across the signal from the video camera until it cuts off 90% of the laser beam. The laser beam width is defined as the distance between 10% and 90% positions multiplied by a correction factor relating it to the second moment value. The knife-edge and $D_{86}$ definitions function to approximate the second moment definition widths of a laser beam.

A fourth definition of laser beam width is referred to as aperture wherein an aperture is drawn around the laser beam centroid. The size of the aperture is increased until it includes 86% of the energy of the laser beam whereupon the size of the aperture is taken as the diameter of the laser beam.

A fifth definition of laser beam width is known as Full Width Half Max (FWHM) and is performed by making a measurement on the width of the laser beam at the positions that are exactly half the energy of the peak. Alternatively, the Full Width Half Max definition can be altered so that the percent energy of the peak is defined by the user. A common percent is 13.6%, which corresponds to the $1/e^2$ point, and on a perfect Gaussian beam provides results which are equivalent to those obtained using the $D_{86}$ definition or the corrected knife-edge definition described above.

The commonly accepted beam widths for non-top hat laser beams fall into two basic categories, second moment and FWHM. The D86, knife-edge, and aperture definitions are all attempts at finding a the second moment beam width equivalent. In all of the above mentioned definitions, except FWHM and some alteration of FWHM, any baseline offset error or shading present in the video camera has a very significant effect on the resulting measurement. For example, if a relatively small laser beam covers $10 \times 10$ pixels out of a $120 \times 120$ pixel array, the total integrated energy in the beam, if the peak is saturated, would be a maximum of 25,600 digital counts using an 8-bit digitizer. If the baseline offset were in error by only 1 digitizer count out of 256, the baseline would contribute 14,400 counts, or more than half the signal in the laser beam. Thus, a beam width measurement that integrated energy in the area of the beam, could be in error by more than 100%. Thus, it is critical that the baseline of the camera be properly set in order to make valid laser beam width measurements.

In view of the foregoing, it would be an advance in the art to provide a method and apparatus which overcomes the noted problems and which provides improved dimensional measurements using commercially available video cameras.

BRIEF SUMMARY AND OBJECTS OF THE INVENTION

In view of the above described state of the art, the present invention seeks to realize the following objects and advantages.

It is a primary object of the present invention to provide a method and apparatus for correcting deficiencies in video cameras used for performing dimensional measurements.

It is also an object of the present invention to provide a method and apparatus for correcting baseline offset inherent in some video cameras without losing any signal components that may otherwise be obscured due to noise.

It is also an object of the present invention to provide a method and apparatus for correcting baseline shading or tilt inherent in some video cameras without losing any signal components.

It is a further object of the present invention to provide a method and apparatus for correcting both baseline offset error and baseline shading or tilt without losing any signal components that may otherwise be obscured due to noise.

It is a still further object of the present invention to provide a method and apparatus for correcting pixel to pixel fixed pattern offset present in some video cameras.

It is yet another object of the present invention to provide a method and apparatus for correcting errors involving less than one digital count which are present in some video cameras used for making dimensional measurements.

It is another object of the present invention to provide a method and apparatus for improving the results of using video cameras in laser beam diagnostics and performance evaluations.

It is a further object of the present invention to provide a method and apparatus for improving the linear measurement of a laser beam profile using a video camera where the laser beam exhibits low intensity wings.

It is another object of the present invention to provide a method and apparatus for correcting baseline offset error and poor signal-to-noise ratio inherent in some video cameras without losing any signal components that may otherwise be obscured due to noise.

It is an additional object of the present invention to provide a method and apparatus for improving dimensional measurements made using optical techniques and video cameras.

These and other objects and advantages of the invention will become more fully apparent from the description and claims which follow, or may be learned by the practice of the invention.

The present invention provides a method and apparatus for improving the performance of video cameras used to make dimensional measurements. The present invention is particularly well suited for improving dimensional measurements of laser beams using cameras such as CCD cameras and vidicon cameras. Such cameras have particular drawbacks including baseline offset error, shading error, and poor signal-to-noise ratio.

One preferred method of the present invention provides that the baseline offset error is corrected without the loss of any signal components that may otherwise be obscured due to noise. The method of the present invention is carried out using a video camera and a digitizer which processes the output of the video camera.

According to one aspect of the preferred correction method, the baseline of the signal is raised above the digitizer's zero level, an average baseline without an input signal present is determined, and then the average baseline is subtracted from the subsequently obtained signals. The subtraction process is performed such that the subsequent frames in memory retain all negative signal components, as well as positive signal components, and thus there is no loss of the desired signal. Any subsequent quantitative measurements consider both the positive and negative signal components and thus measurements are made as accurately as possible. After the baseline error is corrected, one or more of a number of noise reduction methods are implemented to improve the signal-to-noise ratio.

One method for improving the signal-to-noise ratio comprises the steps of obtaining a plurality of frames each including both noise and an optical signal and then averaging the plurality of frames together to provide a representative signal wherein the optical signal is extracted from the noise. Another method for improving the signal-to-noise ratio comprises the steps of determining a plurality of resulting spatial measurement representations based upon the noise and optical signal and averaging the plurality of resulting spatial measurement representations wherein the signal is extracted from the noise.

In accordance with another aspect of the present invention, the deficiencies of baseline offset error, shading, fixed pattern and random temporal noise can all also be corrected. The method includes the steps of blocking all optical signals from reaching the camera and adjusting the zero baseline of the signal output by the camera such that all noise is represented by positive counts output from the digitizer and a baseline signal is produced. Next, a plurality of frames containing the baseline signal are averaged to obtain a reference frame. This reference frame is referred to as a sub-count reference frame since the averaging process provides a resulting reference frame having an accuracy which is less than one digitizer count or "sub-count."

The optical signal, for example a laser beam, is allowed to reach the camera and subsequent digitized frames are generated. The reference frame is then subtracted from each of the subsequent digitized frames to correct for deficiencies in the signal output from the video camera to produce accurate dimensional measurements. Such deficiencies include baseline offset, shading, and fixed patterns in pixel offsets. The correction occurs such that no received optical signal components are lost. Further steps are preferably carried out to improve the signal-to-noise ratio of the signal output from the video camera.

In another aspect of the present invention, an apparatus for improving the performance of video cameras used for making dimensional measurements is provided. The video camera provides an output signal comprising both noise and an optical signal. A means for acquiring the output signal from the video camera and a means for digitizing the optical signal contained in the output signal is provided. Also provided are means for adjusting the baseline of the received signal such that all noise is represented by positive going counts and such that the mean of the baseline is centered at a predetermined positive integer digital count to arrive at a reference baseline level and means for subtracting the reference baseline from subsequent frames to correct for baseline error.

Also provided to improve the signal-to-noise ratio of the output signal are a means for obtaining a plurality of frames each representing both noise and an optical signal and means for averaging the plurality of frames together to provide a representative signal wherein the optical signal is extracted from the noise.

Another apparatus to improve the signal-to-noise ratio comprises means for determining a plurality of resulting measurement representations based upon the noise and optical signal and means for averaging the plurality of linear measurement representations wherein the optical signal is extracted from the noise.

Still another apparatus to improve the signal-to-noise ratio of the output signal comprises means for providing an aperture around the optical signal. Yet another apparatus for improving the signal-to-noise ratio of the output signal comprises means for averaging a line in the video camera. An even further apparatus for improving the signal-to-noise ratio of the output signal comprises means for averaging an area in the camera.

In accordance with another aspect of the present invention, a further apparatus for improving the performance of video cameras used for making dimensional measurements is provided. In one preferred embodiment, a means for acquiring the received signal from the video camera and a means for digitizing the optical signal contained in the received signal is provided. A means for adjusting the zero baseline of a signal output by the camera is included such that all noise is represented by positive counts output from the digitizer and a baseline signal is produced. Also furnished is a means for averaging a plurality of frames containing the baseline signal to obtain a reference frame and a means for subtracting the reference frame from subsequent digitized frames to correct for deficiencies in the signal output from the video camera to produce accurate dimensional measurements.

The preferred means for averaging a plurality of frames containing the baseline signal comprises a means for summing a plurality of frames and a means for dividing a value obtained for each pixel in the plurality of frames by the number of frames to arrive at a sub-count reference frame. The deficiencies which are corrected include baseline offset, shading, and fixed patterns in pixel offsets. The correction takes place such that no received optical signal components are lost. The preferred apparatus also includes means for improving the signal-to-noise ratio of the received signal such as previously described. The apparatus of the present invention is preferably carried out using digital processing techniques and equipment.

BRIEF DESCRIPTION OF THE DRAWINGS

In order to better appreciate how the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
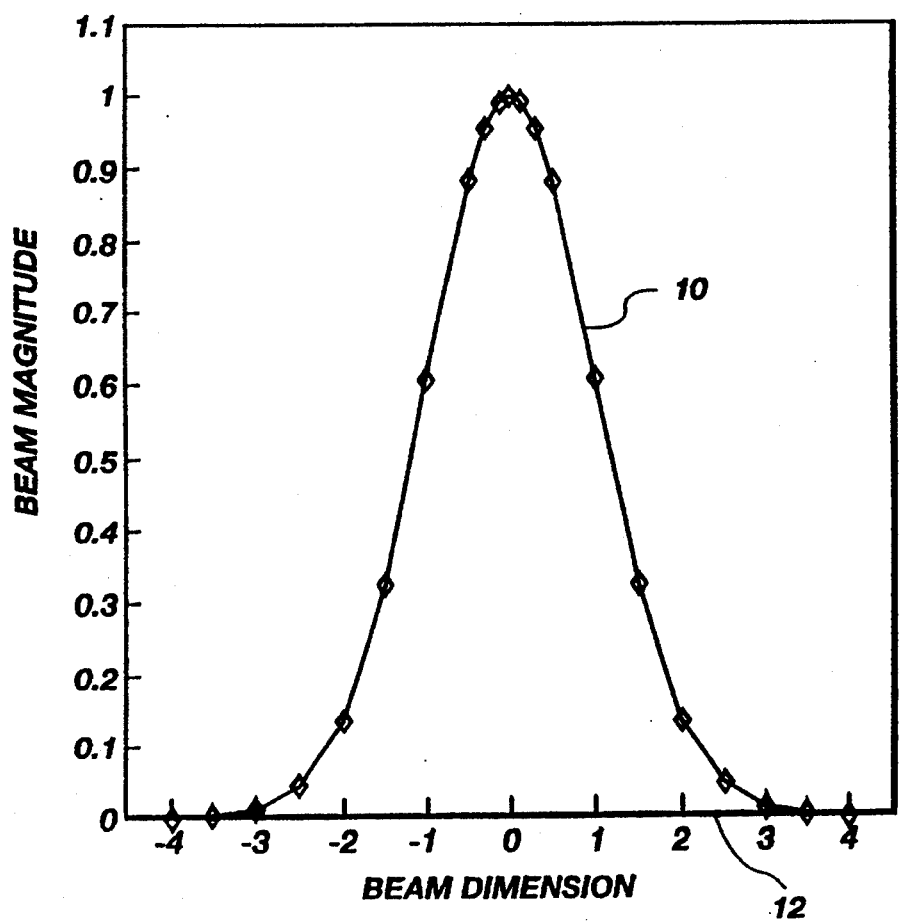
FIG. 1 is a graphical representation of laser beam signal strength and its relationship to the digitizer baseline in a theoretical measurement system.

In the following description, measurement of the width of a laser beam will be used to explain the present invention. Measuring the width of a laser beam using video-cameras often encounters serious problems such as baseline offset error, shading, and fixed patterns in pixel offsets, and noise. Significantly, the method and apparatus of the present invention apply to other quantitative dimensional measurements made with various video cameras, for example, CCD cameras or vidicon cameras, accompanied by appropriate signal processing apparatus and techniques. For example, the present invention can be applied in many applications using video cameras to optically make quantitative dimensional measurements.

With regard to CCD cameras and vidicon cameras, CCD cameras are generally a good choice for use in laser beam analysis systems. CCD cameras have many desirable characteristics that make them a good choice for spatial profile measurements of laser beams. Some of these desirable characteristics are: Simultaneous matrix, whole beam measurement; Relatively high resolution, as low as 9 $\mu$m per pixel; Linear output signal vs. input power; Wide spectral coverage from 190 nm to 1.1 $\mu$m; Relatively uniform responsivity over the light sensing surface; A CCD apparatus is a rugged solid-state device; and, Commercially available CCD cameras are relatively inexpensive and provide high performance.

An apparatus for laser beam analysis generally includes a video camera with associated optics and signal processing electronics including devices such as a digitizer, general purpose processor, a display, and other devices known in the industry.

As indicated earlier, video cameras such as CCD cameras inherently have deficiencies that limit their ability to provide high precision measurements of laser beam characteristics. In order to obtain accurate laser beam measurements, such deficiencies which heretofore have been unrecognized or accepted as inevitable in the industry, must be overcome.

One principal deficiency of CCD cameras is the relatively low saturation level of the light sensing device. The relatively low saturation level results in a low signal-to-noise ratio, even when the signal is close to the saturation level of the CCD camera. The problem of low signal-to-noise ratio becomes even more acute under conditions where the signal cannot be adjusted so that it is close to the saturation of the camera or when gathering information on the relatively low intensity wing portions of a laser beam.

CCD cameras typically have a signal-to-noise ratio of about 300 when comparing peak signal at saturation to RMS noise. In this case, the RMS noise is equivalent to the 1 sigma level of the standard deviation of the noise distribution. While a signal-to-noise ratio of 300 appears adequate for many applications, in laser beam measurement applications such a characteristic translates to a peak-to-peak signal-to-noise ratio of only about 50, where the peak-to-peak signal level is typically plus or minus three standard deviations.

This high noise level, equivalent to 2% of saturation of the laser beam, inhibits accurate measurements of beam characteristics especially in the wings of the laser beam where signal levels are low. An adequate signalto-noise ratio is particularly important when making laser beam diameter measurements since the diameter of a laser beam is in some cases defined to be the $1/e^2$ point, or the point on the laser beam profile in the wing where the intensity is only 13.5% of the peak intensity. As explained earlier, other definitions of laser beam width present a similar situation.

Significantly, if the signal-to-noise ratio is 50 at the peak, the signal-to-noise ratio at the $1/e^2$ point of the laser beam may be as low as about 7. If the peak signal were only 50% of saturation, the signal-to-noise ratio at the $1/e^2$ point would deteriorate to as low as 3. This low signal-to-noise ratio can have a serious effect on the measurement of laser beam diameter.

The inherent high noise level present in CCD cameras, in addition to influencing the accuracy of measurements, also compels the use of cumbersome beam attenuation optics. Since both the signal-to-noise ratio and the dynamic range of CCD cameras is low, it is generally necessary to adjust the laser beam energy to be very near saturation for each measurement. If a series of measurements are being made, wherein the beam intensity changes significantly, then adjusting the beam close to saturation can become very time consuming and cumbersome.

Another serious drawback of CCD cameras is variation in the camera baseline offset, or zero signal level. Since all signal levels are measured riding on the baseline offset, errors in the offset adjustment can directly affect measurement of laser beam profile properties.

The baseline offset adjustment of a CCD camera influences measurements with the camera for a number of reasons. For example, the camera offset level drifts with time, with temperature of the environment, with aging, and especially during the first 1–2 hours as the camera heats up after being turned on.

Any shift or drift in offset is especially serious in the case of two laser beam measurement conditions. The first measurement condition where shift or drift in offset is especially serious is when the laser beam is low intensity thus resulting in low level signals. Under low signal levels the signal-to-noise ratio is poorer and the effect of offset errors are multiplied on any dimensional measurements which are made.

The second measurement condition occurs when very small laser beams, that cover only a few pixels, are being measured. In the case of very small laser beams, a small error in the baseline, averaged over all the pixels, can create a greater signal than the laser beam itself.

The problems caused by baseline offset and noise encountered when measuring laser beam intensity profiles and dimensions will be explained by referring to FIGS. 1–4. FIG. 1 illustrates a typical profile of a laser beam assuming a perfect video camera with zero noise. In FIGS. 1–4 and 6, the diamonds represent the plot of a Gaussian laser beam while the vertical axis represents the laser beam intensity and the horizontal axis represents the beam dimension. Also, FIG. 1 assumes that the baseline is flat and adjusted perfectly so that measurements can be made precisely on the energy in the laser beam. In FIG. 1, as well as in FIGS. 2–4, and 6 the laser beam signal is represented by the curve 10 and the digitizer baseline is represented by the horizontal line 12.

Figure 2:
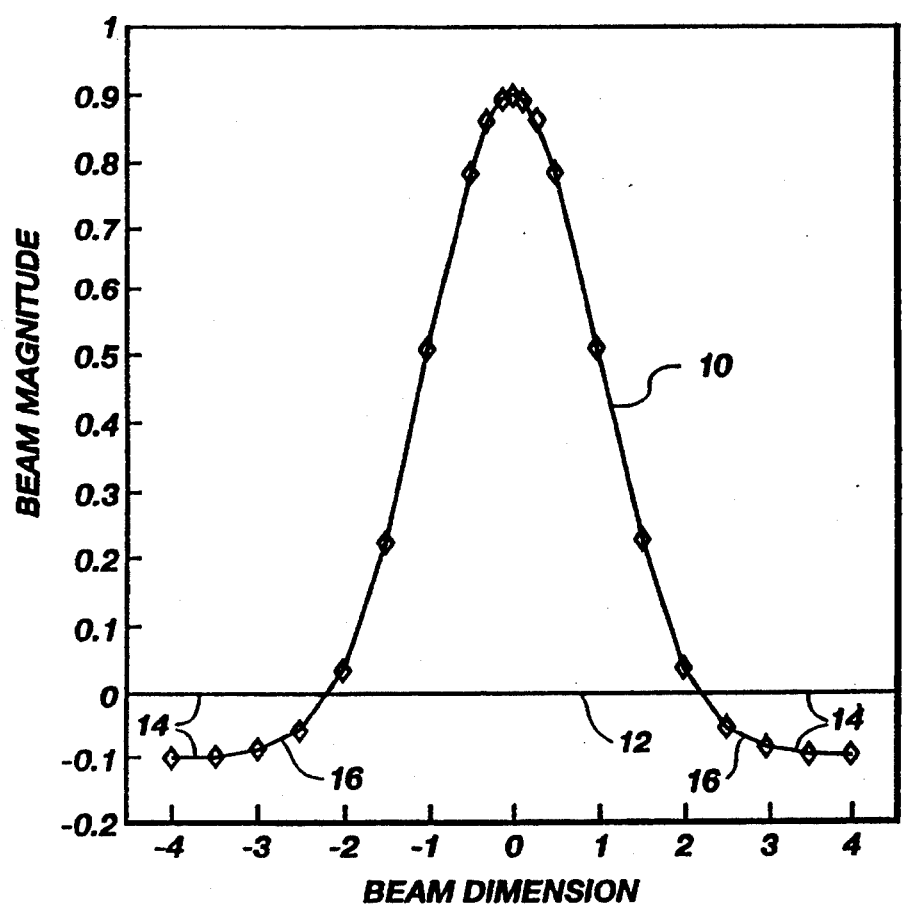
FIG. 2 is a graphical representation of laser beam signal strength and its relationship to the digitizer baseline where the baseline offset is too low.
Figure 3:
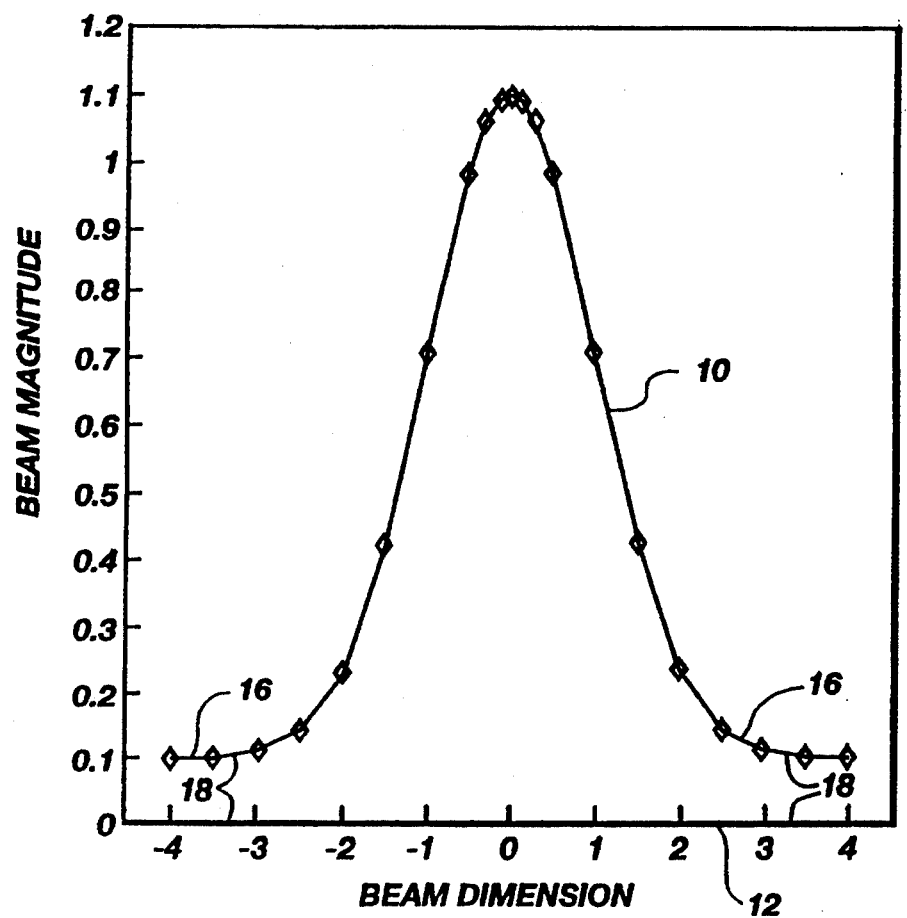
FIG. 3 is a graphical representation of laser beam signal strength and its relationship to the digitizer baseline where the baseline offset is too high.

FIGS. 2 and 3 illustrate a laser beam in the presence of baseline offset. In FIG. 2 the baseline offset, represented by gap 14, is adjusted too low and the low intensity wings 16 of the laser beam are suppressed below the digitizer zero cutoff. Thus, information in the wings 16 is suppressed, and any resulting measurement of beam width will be smaller than the actual laser beam width.

In FIG. 3, the baseline offset, represented by gap 18, is adjusted too high so that even where there is zero actual signal the digitizer would output a positive count or value. In the case represented by FIG. 3, any resulting dimensional measurement on a laser beam would result in a beam width measurement which is larger than the actual beam width.

Figure 4:
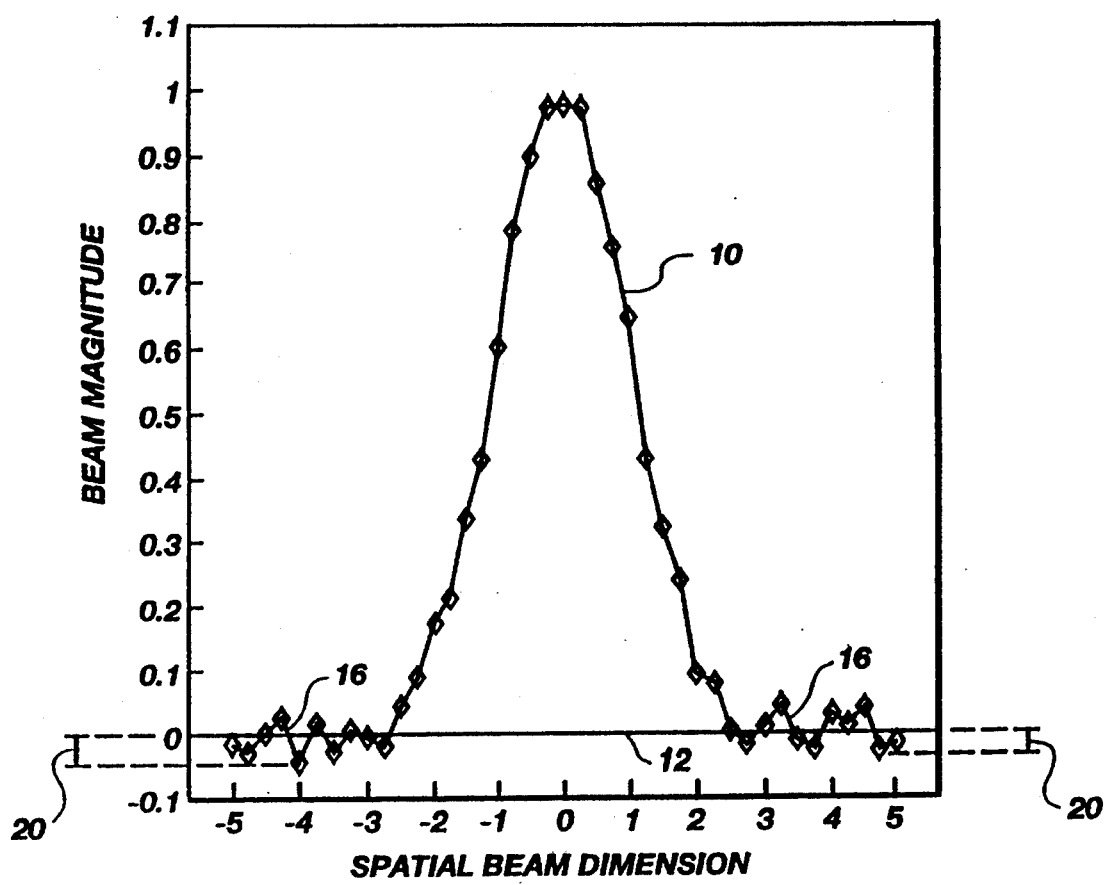
FIG. 4 is a graphical representation of laser beam signal strength and its relationship to the digitizer baseline where the baseline offset is correct but noise is present on the signal.

FIG. 4 illustrates the situation where the baseline offset is correctly adjusted but noise inherent in video cameras, for example a CCD camera, is present. With the presence of noise, some components (represented at 20) of the laser beam signal 10 are suppressed below the digitizer baseline 12 and thus are lost.

Techniques have been proposed in the past to partially compensate for baseline offset and noise encountered when measuring laser beam dimensions. One technique is referred to in the art as "reference frame subtraction" or "baseline reference subtraction" and another technique is referred to in the art as "signal averaging."

In the case of FIG. 3, where the baseline offset is too high, reference frame substraction requires that data representing a signal frame with no laser beam signal present be stored in memory and that frame be subtracted from every subsequent frame which contains the laser beam signal. Disadvantageously, the previously available reference frame subtraction techniques only result in the case of FIG. 4 wherein noise is present and the negative noise components are discarded. This causes laser beam signal levels 20 below the baseline 12 to be suppressed and lost.

In addition, the reference frame subtraction technique works to correct baseline offset only when the baseline offset is too high as in the case represented in FIG. 3. In the case of the baseline offset being too low, as represented in FIG. 2, it is not possible to digitize signal portions below the zero baseline 12, and therefore there is no possibility of subtracting a negative baseline offset.

At best, reference frame subtraction can only remove gross errors in the baseline offset if the errors are in the positive direction. That is, only if the baseline level is higher than the zero digitizer level. If, however, the baseline is in the opposite direction, that is, it is negative from the zero digitizer level, then it is impossible to detect how much baseline offset exists, and the previously available reference frame subtraction technique cannot correct for such offset.

When signal averaging is used for improving signal-to-noise ratio in laser beam analysis, the laser beam signal is averaged over multiple frames resulting in a suppression of noise. Disadvantageously, whenever the averaging is performed with ideal baseline adjustment as in FIG. 4, many of the negative signal components are still lost and the averaging does not adequately correct for any signal components below zero.

Thus, with some video cameras, such as standard CCD cameras and vidicon cameras, and standard digitizers commonly used in the industry, there is no way to adequately correct for baseline offset and noise, especially when accurate dimensional measurements are desired. This is especially true in the case of measurement of laser beams where a significant amount of information in the beam can be contained in the low intensity wings. The low intensity information in the wings cannot be recovered by previously available averaging or baseline subtraction techniques due to loss of the negative signal components in the digitizer.

In accordance with one aspect of the present invention, a method and apparatus is provided which compensates for both low signal-to-noise ratio and baseline offset error inherent in CCD cameras and other video cameras. It is preferred that digital signal processing techniques be used to implement the present invention and minimize the effects of poor signal-to-noise ratio and baseline offset error. Those skilled in the art will be able to use the information provided herein to arrive at appropriate programming code for use in digital processors to carry out the present invention. Using the method and apparatus described herein, it becomes possible to make accurate dimensional measurements not previously possible. By use of the described methods of the present invention, CCD cameras and vidicon cameras can be used to make accurate dimensional measurements which would not otherwise be possible with such cameras.

In accordance with the present invention, both baseline error correction and reduction of noise (improvement of signal-to-noise ratio) is advantageously provided. The method and apparatus of the present invention corrects for baseline offset error and for low signal-to-noise ratio while preserving the signal components which are buried in the noise. By preserving the signal components which would otherwise be obscured by the noise, such signal components can be recovered and used to make measurements.

Figure 5:
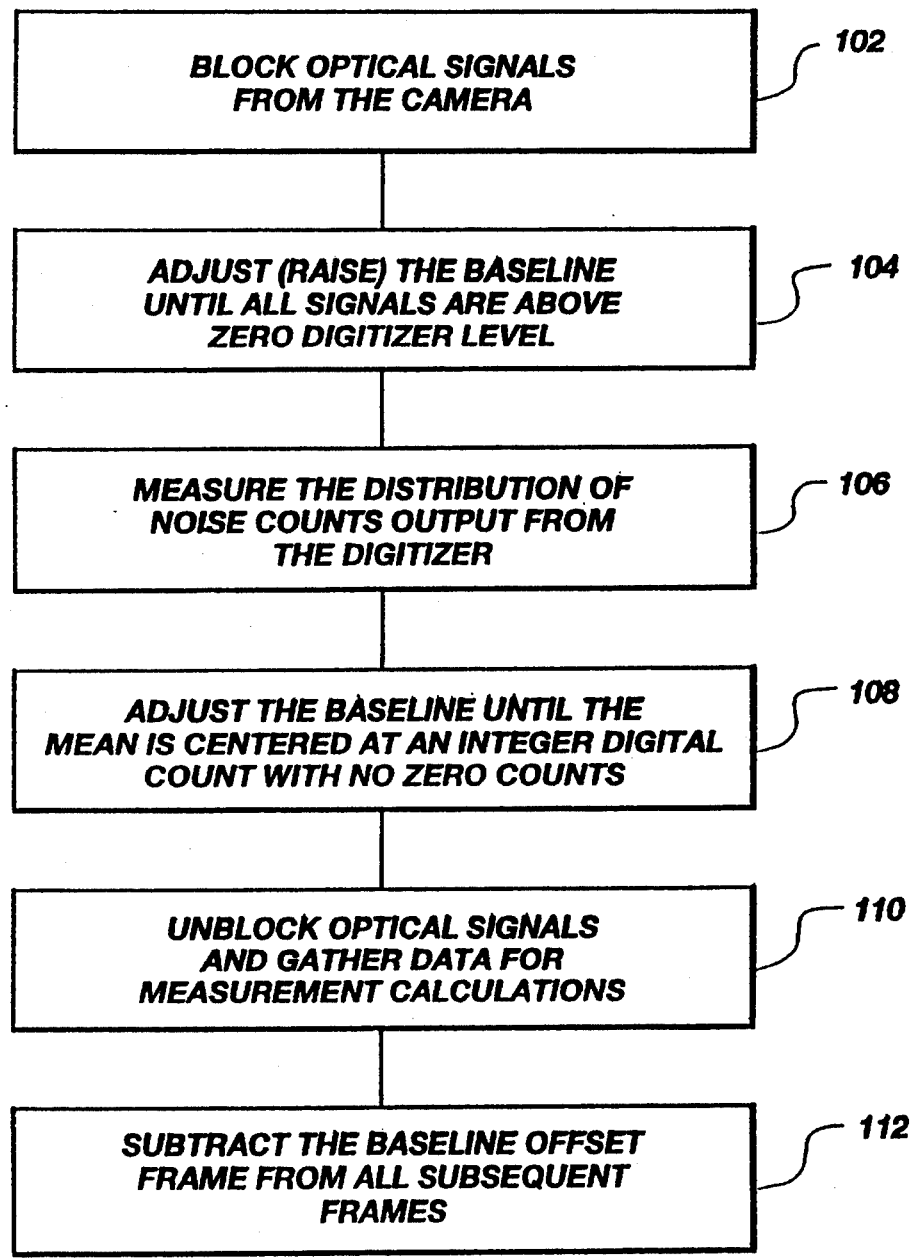
FIG. 5 is a flow chart showing the preferred steps for carrying out the baseline error correction method of the present invention.

In accordance with the method of the present invention, the steps of one preferred method for correcting the baseline error are represented in FIG. 5. To correct the baseline offset error inherent in the camera, all optical signals, i.e., the laser beam, are first blocked from the video camera (Step 102). Blocking of the optical signals allows the baseline to be corrected in the absence of any laser beam signal.

The baseline is next raised, including noise, until all signals are above the zero digitizer level, that is, until there are no zero digitizer counts (Step 104). Thus, all signal components are obtained when digitizing the signal. This is in contrast to the result of losing low level signals when using the previously available techniques.

In accordance with the present invention, a preferred method used to calibrate the amount the offset should be raised will be described. One preferred calibration method involves adjusting the baseline offset and then measuring the distribution of noise counts (Step 106). The noise found in the output of a CCD camera typically exhibits a Gaussian distribution and is centered at a given count with a plus and minus deviation above and below the mean. The baseline is adjusted (incrementally either by adjusting the camera or using digital processing) until the mean is centered at an integer digital count with no zero counts (Step 108). Stated another way, the baseline is adjusted such that there is an equal number of pixel counts (representing noise only) above the mean as there are below the mean. The mean of the noise counts, n, is then subtracted from each frame to obtain an average zero count in the measurement of the entire frame. This subtraction process is done, maintaining minus noise component levels, so that no information component is lost. Once the baseline offset is adjusted so that the mean is centered at an integer digital count, it becomes possible to subtract this mean digital count from all signal components. The optical signal is then unblocked (Step 110) and data for measurements is gathered to form additional frames and the baseline offset is subtracted therefrom (Step 112). Stated another way, the baseline offset is subsequently subtracted from all subsequent signal frames to correct the baseline offset error.

In contrast to the previously available techniques, the subtraction step of the present invention preserves negative signal counts as well as positive signal counts, and thus none of the laser beam signal is lost. With the baseline properly adjusted, measurements can be made on beam widths with all components, both positive and negative, being preserved in memory following the subtraction process.

It will be appreciated by those skilled in the art that the baseline error correction method of the present invention is most preferably carried out using digital signal processing techniques. It is, however, within the scope of the present invention to carry out the method of the present invention using analog signal processing techniques or a combination of digital and analog processing techniques.

In addition to baseline error correction, it is within the scope of the present invention to carry out further steps to improve the signal-to-noise ratio. Similarly to the method of correcting baseline error, the subsequent signal processing carried out to improve the signal-to-noise ratio is conducted so that substantially no laser beam signal components are lost.

Once the baseline error has been corrected in accordance with the present invention without suppressing any negative laser beam signal components, other techniques for improving signal-to-noise ratio, and thus dimensional measurement accuracy, can be carried out within the scope of the present invention. The preferred steps which can be carried out to improve the signal-to-noise ratio which are combined with the steps for correcting baseline error will be explained below. It will be appreciated that while some of the steps carried out to improve the signal-to-noise ratio have been proposed in the art, their combination with the baseline error correction method of the present invention provides results not heretofore available or suggested in the art.

As is known, the noise which is present on a given pixel is random and has a normal distribution in its magnitude over time. Also, there is a random noise component of all the pixels in a given frame that is also a normal distribution about a mean noise level. That is, summing all the pixels in the entire frame will yield a mean with a normal distribution. The laser beam signal to be measured effectively rides on top of the baseline offset and is immersed in the random noise pattern.

Figure 5A:
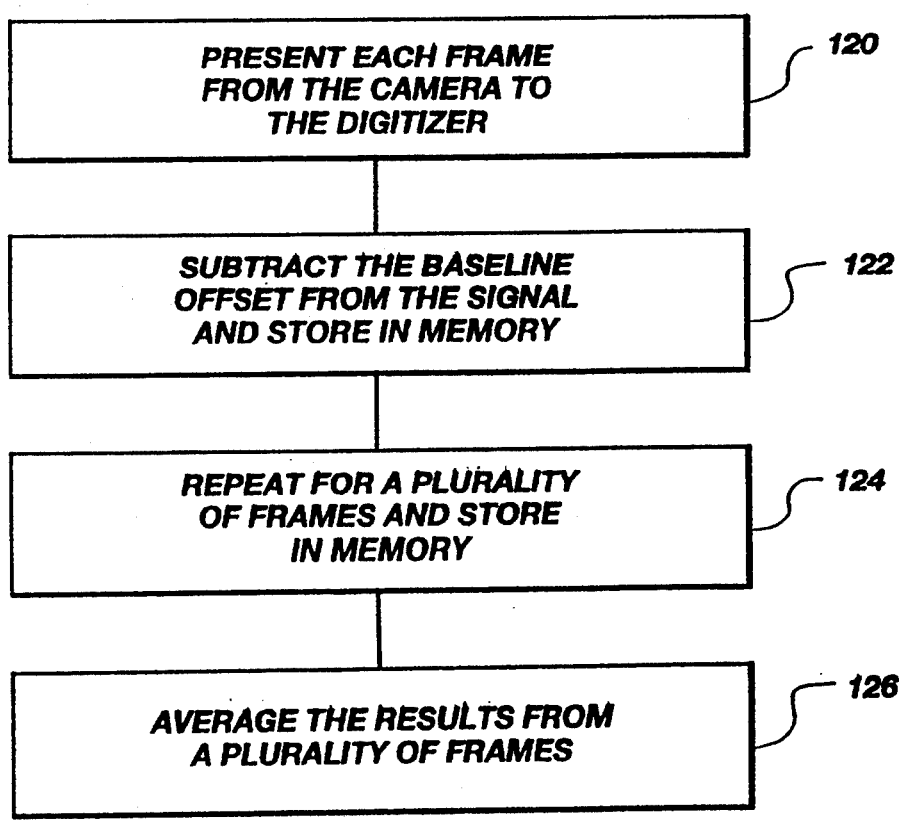
FIG. 5A is a flow chart showing the preferred steps for carrying out the frame averaging method in accordance with the present invention to improve signal-to-noise ratio.

One preferred method for use in combination with the preferred baseline error correction method of the present invention is referred to as frame averaging. Referring to FIG. 5A, the preferred steps for carrying out frame averaging for improving signal-to-noise ratio are represented.

Each frame from the CCD camera with signal present is input to the digitizer (Step 120). The baseline offset level is subtracted from the signal and the resulting information is stored in memory (Step 122). With the preferred frame averaging method of the present invention, the above steps are repeated for a plurality of frames (Step 124), each of the frames retaining the positive as well as all negative signal components, and the data for the multiple frames is averaged (Step 126). Thus, the frame averaging method is able to improve the signal-to-noise ratio without losing any signal components. Typically, the frame averaging method of the present invention described herein can be expected to improve the signal-to-noise ratio by the square root of the number of frames averaged.

Regarding the use of the frame averaging method, when a laser beam is jittering in position, but not in size, the frame averaging method can result in errors. Typically, a laser beam which is jittering in position but not in size and on which frame averaging is carried out would result in measurements indicating a larger beam dimension than was actually present.

Figure 5B:
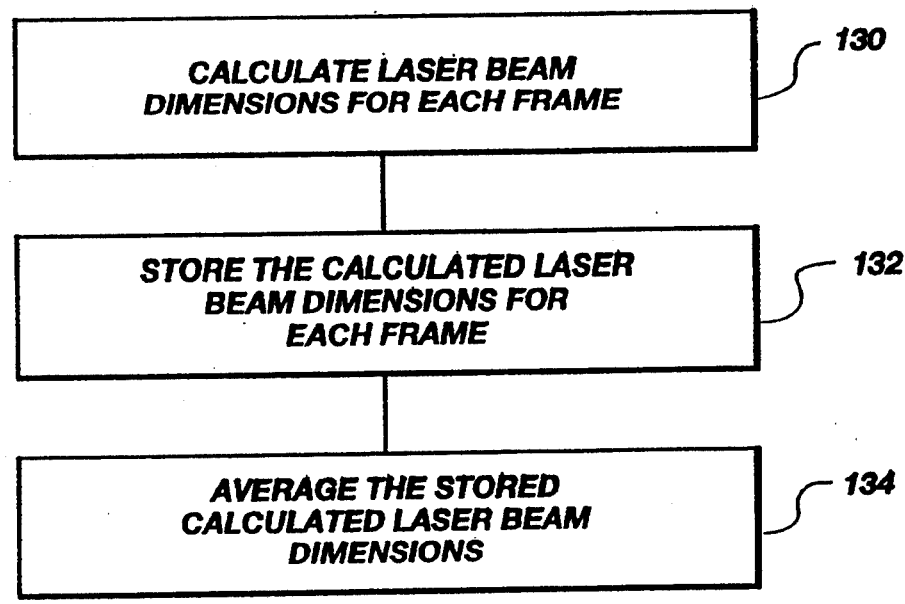
FIG. 5B is a flow chart showing the preferred steps for carrying out the results averaging method in accordance with the present invention to improve signal-to-noise ratio.

Another preferred noise reduction method for use in combination with the described baseline error correction method of the present invention is referred to as results averaging. Referring to FIG. 5B, the preferred steps for carrying out the results averaging method for improving signal-to-noise ratio are represented. The results averaging method provides more accurate results than the frame averaging method when the laser beam is jittering in position, but not in size.

Using results averaging, the laser beam dimensions of each individual frame are calculated (Step 130) and the calculated laser beam dimensions for each individual frame are stored (Step 132). The stored laser beam dimensions are then averaged (Step 134). The results averaging method of the present invention described herein can be expected to improve the signal-to-noise ratio as the square root of number of frames averaged.

A further preferred method for use in combination with the preferred baseline error correction method of the present invention is referred to as area averaging. The area averaging method can be used to improve many measurements made on laser beams. For example, a beam diameter measurement may sum all signal components above a certain threshold level and a diameter is calculated from the sum of pixels. In this case, the noise is suppressed by the averaging process that comes from summing areas. Using the area averaging method, the signal-to-noise ratio improves as the square root of the number of pixels in the area.

A still further preferred method for use in combination with the preferred baseline error correction method of the present invention is referred to as line averaging. The line averaging method measures, for example, an equivalent knife edge passing across the laser beam. The line averaging method of the present invention includes the average of all the pixels in a given line which is used to calculate the dimensions of the laser beam. With the line averaging method, the signal-to-noise ratio improves as the square root of the number of pixels in the line.

Yet another preferred method for use in combination with the preferred baseline error correction method of the present invention places an aperture about the area to be measured. For example, apertures drawn around small beams can remove additional noise found beyond the wings.

The methods of frame averaging, line averaging, area averaging, and results averaging all reduce the influence of noise which can cause errors in laser beam dimension measurements.

It will also be appreciated that it is within the scope of the present invention to use a combination of the above described methods. For example, line averaging and area averaging can be used in conjunction with frame averaging or results averaging, even further in combination with aperture methods, to obtain maximum improvement possible in signal-to-noise ratio and dimensional measurement accuracy. Those skilled in the pertinent art will be able to determine the extent and quantity of data which should be considered in any averaging method such as those described above.

With the methods described above, the dimensional measurements made using video cameras, such as CCD cameras, are much more accurate than previously possible using such cameras. By making these dimensional measurements using both the positive and negative signal components, the measurement of laser beams can be made to a high degree of accuracy with no loss of signal which represents the wings of the laser beam.

In addition to the problems of baseline offset and noise as explained above, many video cameras, also exhibit problems described as "shading" or "tilt." One type of shading is fixed shading which is defined as a slope of the baseline from one side of the light sensing surface to the other side of the light sensing surface of the video camera. Fixed shading can also be expressed as a curved slope which might be high on both ends and low in the middle. In addition, there may also be the problem of fixed pattern offset from pixel to pixel. Such pixel to pixel fixed pattern offset is typically low in CCD cameras and much more severe in video cameras such as self-scanned FET array video cameras.

In the case of CCD cameras, in addition to offset drift, shading is generally also present which distorts the measurements. As mentioned, shading can be described as a slope in the baseline level from one portion of light sensitive surface in the video camera to another. For example, typical shading in CCD cameras from top to bottom is minimal but from side to side is often significant. Moreover, shading in vidicon cameras is far more serious than encountered in CCD cameras. Thus, vidicon cameras using PbO-PbS sensors and vidicon cameras using pyroelectric sensors for detection of infrared energy are much more prone to exhibit shading and can significantly benefit from the present invention just as CCD cameras.

Figure 6:
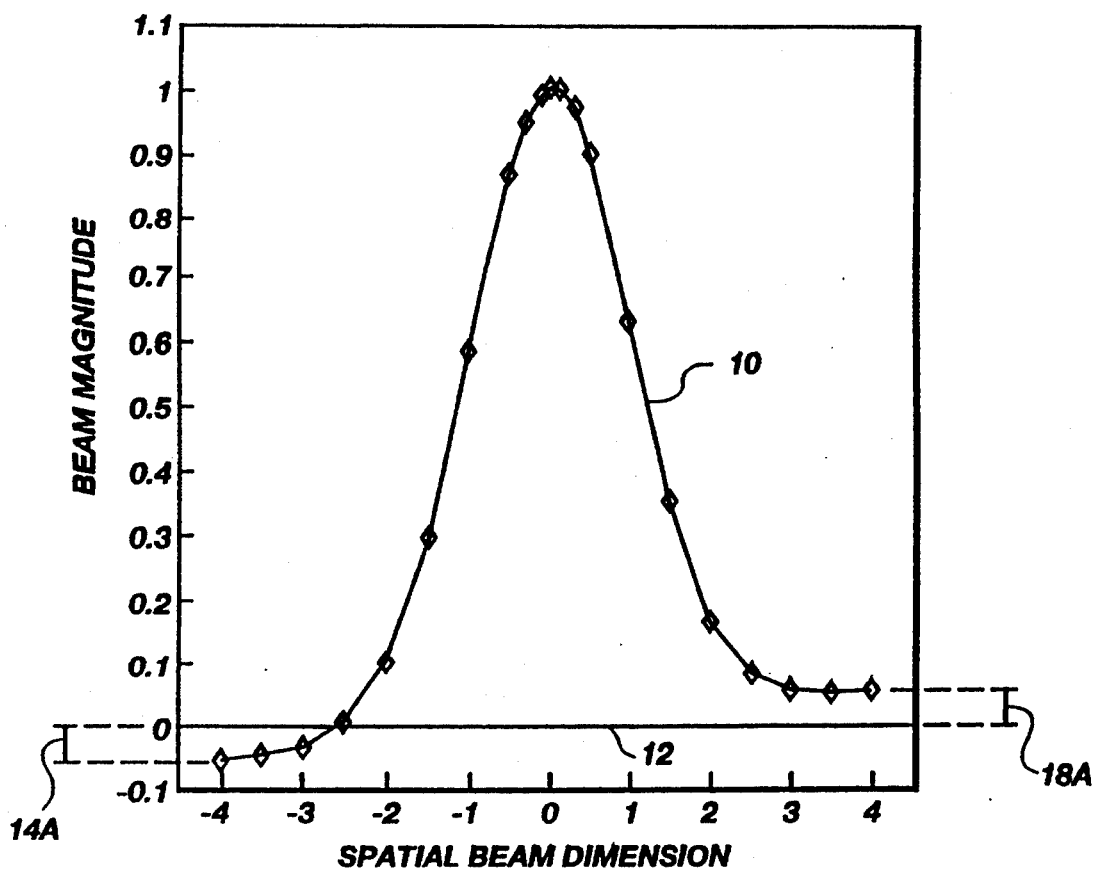
FIG. 6 is a graphical representation of baseline shading error inherent in some video cameras.

FIG. 6 is a graphical representation of a laser beam in the presence of fixed baseline shading. In FIG. 6, the baseline offset is too low on one side, represented by gap 14A, and a portion of the low intensity wings 16A of the laser beam are suppressed below the digitizer zero cutoff. The baseline offset is adjusted too high on the other side, represented by gap 18A, so that even where there is zero actual received optical signal the digitizer would output a positive count or value.

It will be appreciated that where fixed shading or fixed pattern offset from pixel to pixel is a problem, the previously described method of the present invention may not correct for all of the deficiencies. Thus, a further aspect of the present invention will be described to provide additional improvement when making dimensional measurements using video cameras.

As in the previously described preferred methods, it will be appreciated that those skilled in the art will be able to use the information provided herein to arrive at appropriate programming code for the apparatus of the present invention to make a variety of dimensional measurements.

Figure 7:
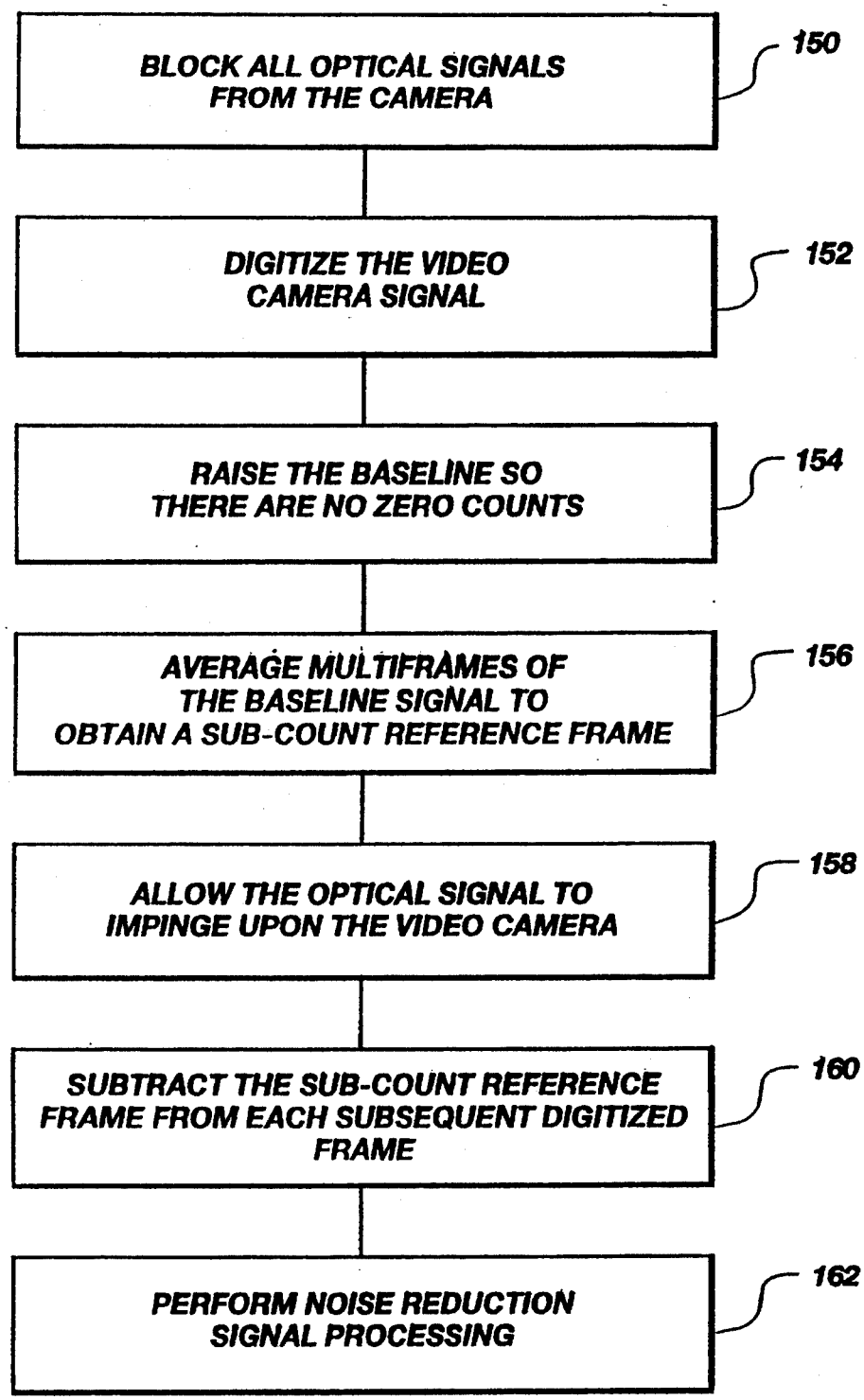
FIG. 7 is a flow chart showing the preferred steps for carrying out the baseline shading error correction method of the present invention.

Referring now to FIG. 7, the steps of another preferred method of the present invention will be described. As represented at Step 150 in FIG. 7, all optical signals, e.g., the laser beam, are first blocked from the video camera. Then the signal which is output from the video camera is then digitized (Step 152) and the baseline is adjusted high enough above zero so that there are no zero counts (Step 154).

Somewhat similarly, to the method explained in connection with FIG. 5, raising the baseline ensures that there are also no negative noise counts that would be missed by the digitizer. That is, if there were a peak-to-peak of 7 counts of noise in the digitizer, the digital baseline level would be set at 4 counts, so that the minimum count would be 1, and the maximum count would be 7.

In the method represented in FIG. 7, however, it is not necessary to precisely set the digitizer baseline at an integer count, rather, only to ensure that no pixel has a noise count of zero. Those skilled in the art will appreciate that the term noise is being used herein in its broadest sense, that is, noise is intended to include all components contained within the 7 counts including temporal noise, fixed pattern offset, and shading.

Still referring to FIG. 7, Step 156 requires averaging multiple frames of the baseline signal to obtain a reference frame. The reference frame will contain the mean, or average offset of each individual pixel of the camera.

The preferred arrangement for obtaining an average of multiple frames will now be explained. Even though the video camera and the digitizer are accurate to only 8 bits, the signal processing arrangement following the digitizer is preferably capable of processing greater than 8 bits, for example, 16 bits. By use of a 16-bit signal processing arrangement following an 8-bit digitizer allows averaging of the baseline signal to obtain an accuracy much greater than 1 digital count. For example, by summing 256 frames and then dividing by 256, the mean value of each pixel baseline offset can be resolved to within 1/256 of a digital count. With a 16-bit memory this 256 levels of sub-count accuracy can be obtained. Thus, the mean baseline offset of a pixel can be known to an accuracy of 1/256th of a digital count. For ease of reference, data which has been expanded by this frame averaging process will be referred to as data which contains "sub-count" resolution. Thus, by finding the mean baseline offset of each individual pixel, any fractional baseline shading or single pixel offsets will become identified in the reference frame.

In summary, baseline frame averaging is used to remove noise from the baseline reference frame. This process retains fractions of baseline offset to improve precision of subsequent signal processing. This sub-count reference frame is then stored in memory for use in further processing.

Still referring to FIG. 7, the next preferred Step 158 is to allow the optical signal, that is, the laser beam or any other optical signal, to impinge upon the light sensitive surface of the video camera. The next Step 160 is to subtract the sub-count reference frame from each subsequent digitized signal frame. Even though the digitized signal frame is not sub-count at this stage, the subtraction of the sub-count reference frame means that additional error is not introduced due to subtracting a noisy baseline. Thus, the sub-count accuracy is retained in the subtraction step.

Additionally, since the baseline is subtracted from a noisy signal, there will be negative signals generated in the subtraction process. In the method described in FIG. 7, these negative signals are advantageously retained since the true signal rides on this noise. It is important in the accuracy of the processing to retain these negative numbers because they average against positive noise contributions to obtain a more precise baseline.

Thus, the memory following the 8-bit digitizer not only retains sub-count signal levels, but also contains negative numbers.

For further improvement in the signal-to-noise ratio it is now possible to perform additional noise reduction signal processing on the resulting signal (Step 162) and obtain a resulting measurement with much greater accuracy than previously possible. For example, the noise reduction techniques described earlier, and particularly those described in connection with FIGS. 5, 5A, and 5B, are preferred for use in Step 162. In particular, when performing signal averaging to improve the signal-to-noise ratio, the signal is also maintained to sub-count accuracy. As an example, with a 16-bit memory, it is possible to average the signal until it is known to an accuracy of 1/256th of a single digital count. When the sub-count reference frame is subtracted from the sub-count frame, the resultant signal is also accurate to the sub-count level of the baseline and optical signal. This sub-count accuracy includes both corrections for baseline offset error, shading, fixed pattern offset and random temporal noise.

In calculations for laser beam width and other parameters, the sub-count accurate averages for the signal level can be used and thus much higher accuracy measurements of beam widths and other spatial measurements can be performed. Additionally, negative signals that are still present after averaging, which result from the subtraction process, are included in the calculations to preserve their self-canceling influence upon measurement accuracy.

The preferred methods of the present invention provide a significant improvement in baseline offset correction. This improvement in baseline offset results in offset correction performed to a sub-count accuracy. In addition, any shading or individual pixel fixed pattern offsets in the background are also corrected, and corrected to sub-count accuracy. This allows correction of shading error involving less than 1 digital count and also allows information to be extracted that would be otherwise inaccessible without the method of the present invention.

The preferred methods of the present invention also provide averaging of the optical signal and maintaining the average to sub-count accuracy and then subtracting the sub-count reference frame. The method of the present invention gives extremely high precision in the resultant signal for subsequent processing.

The methods of the present invention also maintain negative results from the subtraction step which improves the accuracy of subsequent calculations. Significantly, by keeping negative numbers in the calculations their contribution to area and line averages used in the second moment definitions of laser beam width calculations are preserved.

Using the above techniques, in the case of small area laser beams and/or for low intensity laser beams, the measurement accuracy which is obtained is much greater than possible using prior art techniques. Using the methods of the present invention, signal levels which are ten times smaller than those required by prior art techniques can be used to obtain accurate measurements. This improvement in accuracy is extremely significant in the ability to precisely measure laser beams. Using the methods of the present invention, accuracy of approximately 1% is possible when measuring laser beams. Similar accuracy can also be obtained when making spatial measurements in other applications.

Figure 8:
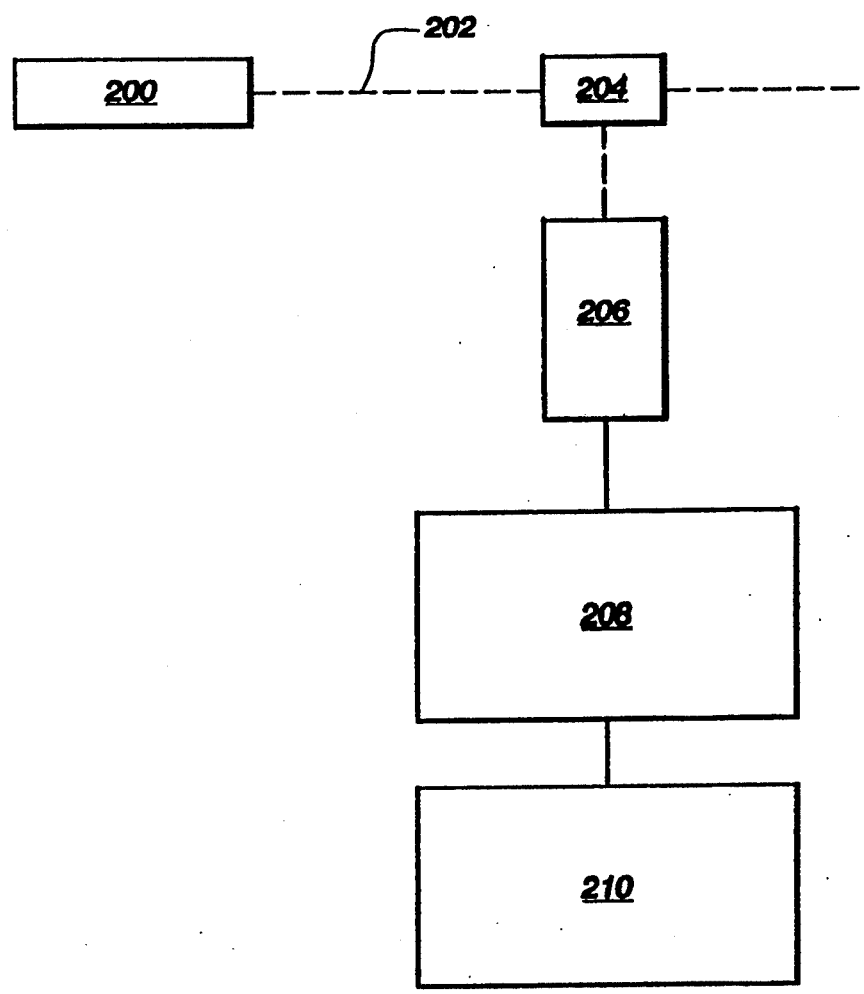
FIG. 8 is a block diagram representing one presently preferred apparatus of the present invention.

Reference will next be made to FIG. 8 which is a block diagram of the presently preferred apparatus of the present invention. It will be appreciated that those skilled in the art can derive many different particular embodiments of the present invention utilizing the block diagram of FIG. 8 and the other information contained herein.

In FIG. 8 a laser 200 is represented. The laser 200 can be any one of a number of laser devices such as continuous wave or pulsed lasers operating in any of a number of frequency ranges. The laser beam 202 emitted from the laser 200 is subjected to a beam splitter 204 to attenuate the intensity of the laser beam 202 and to perform any other necessary optical operations on the laser beam 202.

A portion of the laser beam 203 is diverted to a video camera 206. The video camera 206 can be any one of a number of available video cameras including CCD cameras, vidicon cameras and pyroelectric vidicon cameras. The data output from the camera 206 is input to a processor 208. The processor 208 preferably includes a digital microprocessor, digital memory, a non-volatile mass storage device, and user input devices as are known in the art. An 8-bit analog to digital convertor, also referred to as a digitizer, which generates 256 digital levels, is preferably included in the processor 208. The 8-bit analog to digital convertor is preferably a single-ended 8-bit digitizer, which digitizes only positive going signals, as is commercially available. Other digitizers and other electronic devices can also be used within the scope of the present invention.

The processor 208 is preferably provided with means for communicating with other devices such as a personal computer and a printer (not illustrated). A video monitor 210 provides real time graphical representation and graphical data derived from the laser beam. Information such as beam energy, beam location, beam dimensions, elliptical dimensions, whole beam Gaussian fit, elliptical beam Gaussian fit, top hat measurements, divergence measurement, aperture calculation and display.

In view of the foregoing, it will be appreciated that the present invention provides a method and apparatus for correcting deficiencies in video cameras used for performing dimensional measurements and for correcting baseline offset inherent in some video cameras without losing any signal components that may otherwise be obscured due to noise. The present invention also provides a method and apparatus for improving the results obtained using video cameras in laser beam diagnostics and performance evaluations as well as a method and apparatus for improving the spatial measurement of a laser beam using a video camera where the laser beam exhibits low intensity wings. The present invention also provides a method and apparatus for correcting baseline offset error and poor signal-to-noise ratio inherent in some video cameras without losing any signal components that may otherwise be obscured due to noise. The present invention also provides a method and-apparatus for correcting baseline shading or tilt inherent in some video cameras without losing any signal components and which corrects for pixel to pixel fixed pattern offset.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by Letters Patent is:

1. A method for improving the performance of video cameras used for making dimensional measurements in conjunction with a digitizer having a zero baseline, the dimensional measurements being made in accordance with received optical signals, the method comprising the steps of:

blocking all optical signals from reaching a video camera;

adjusting the zero baseline of a signal output by the video camera such that all noises are represented by positive counts output from the digitizer and such that a baseline signal is produced;

averaging a plurality of frames containing the baseline signal to obtain a reference frame;

allowing the received optical signals to reach the camera and generating subsequent digitized frames; and subtracting the reference frame from the subsequent digitized frames to correct for deficiencies in the signal output from the video camera to accurately produce said dimensional measurements.

2. A method for improving the performance of video cameras as defined in claim 1 wherein the step of subtracting the reference frame from the subsequent digitized frames to correct for deficiencies in the signal output from the video camera comprising the step of subtracting the reference frame from said subsequent digitized frames to correct for baseline offset, shading, and fixed patterns in pixel offsets deficiencies in the video camera so that no components of the received optical signals are lost.

3. A method for improving the performance of video cameras as defined in claim 1 wherein the step of averaging a plurality of frames containing the baseline signal to obtain a reference frame comprises the steps of:

summing the plurality of frames; and dividing a value obtained for each pixel in the plurality of frames by the number of frames to arrive at a sub-count reference frame.

4. A method for improving the performance of video cameras as defined in claim 1 wherein the step of averaging a plurality of frames containing the baseline signal to obtain a reference frame comprises the steps of:

summing 256 frames; and dividing a value obtained for each pixel in the 256 frames by 256 to arrive at a sub-count reference frame.

5. A method for improving the performance of video cameras as defined in claim 1 further comprising the step of improving the signal-to-noise ratio of the signal output from the camera.

6. A method for improving the performance of video cameras as defined in claim 5 wherein the step of improving the signal-to-noise ratio comprises the steps of:

obtaining a plurality of digitized frames, each of said frames representing both the noises and the optical signals; and averaging the plurality of digitized frames together to provide a representative signal wherein the optical signals are extracted from the noises.

7. A method for improving the performance of video cameras as defined in claim 5 wherein the step of improving the signal-to-noise ratio comprises the steps of:

determining a plurality of resulting spatial measurement representations based upon the noises and the optical signals; and averaging a plurality of linear measurement representations wherein the optical signals are extracted from the noises.

8. A method for improving the performance of video cameras as defined in claim 5 wherein the step of improving the signal-to-noise ratio comprises the step of providing an aperture around the received optical signals to block out any undesired optical signal.

9. A method for improving the performance of video cameras as defined in claim 5 wherein the step of improving the signal-to-noise ratio comprises the step of averaging a line in the video camera.

10. A method for improving the performance of video cameras as defined in claim 5 wherein the step of improving the signal-to-noise ratio comprises the step of averaging an area in the video camera.

11. A method for improving the performance of video cameras as defined in claim 1 wherein the step of blocking all optical signals from reaching the camera is the step of blocking all optical signals from reaching a CCD camera.

12. A method for improving the performance of video cameras as defined in claim 1 wherein the step of blocking all optical signals from reaching the camera is the step of blocking all optical signals from reaching a vidicon camera.

13. A method for improving the performance of video cameras as defined in claim 1 wherein the received optical signals are laser beam signals.

14. An apparatus for improving the performance of video cameras used for making dimensional measurements, the video cameras providing signals received from the video cameras comprising noises and optical signals, the apparatus comprising:
means for acquiring the received signals;
means for digitizing an optical signal contained in the received signal;
means for adjusting the zero baseline of the received signal such that all noises are represented by positive counts output from the means for digitizing and for producing a baseline signal;
means for averaging a plurality of frames containing the baseline signal to obtain a reference frame; and
means for subtracting the reference frame from subsequent digitized frames to correct for deficiencies in the signal output from the video camera to accurately produce said dimensional measurements.

15. An apparatus for improving the performance of video cameras as defined in claim 14 wherein the means for subtracting the reference frame from subsequent digitized frames used to correct for baseline offset, shading, and fixed patterns in pixel offsets deficiencies in the video camera so that no components of the received optical signals are lost.

16. An apparatus for improving the performance of video cameras as defined in claim 14 wherein the means for averaging a plurality of frames containing the baseline signal to obtain a reference frame comprises:
means for summing the plurality of frames; and
means for dividing a value obtained for each pixel in the plurality of frames by a number of frames to arrive at a sub-count reference frame.

17. An apparatus for improving the performance of video cameras as defined in claim 14 wherein the means for averaging a plurality of frames containing the baseline signal to obtain a reference frame comprises:
means for summing 256 frames; and
means for dividing a value obtained for each pixel in the 256 frames by 256 to arrive at a sub-count reference frame.

18. An apparatus for improving the performance of video cameras as defined in claim 14 further comprising means for improving the signal-to-noise ratio of the received signals.

19. An apparatus for improving the performance of video cameras as defined in claim 18 wherein the means for improving the signal-to-noise ratio of the received signals comprises:
means for obtaining a plurality of frames each representing both noises and the optical signals; and
means for averaging the plurality of frames together to provide a representative signal wherein the optical signals are extracted from the noises.

20. An apparatus for improving the performance of video cameras as defined in claim 18 wherein the means for improving the signal-to-noise ratio of the output signal comprises:
means for determining a plurality of resulting spatial measurement representations based upon the noises and optical signals; and
means for averaging the plurality of spatial measurement representations wherein the optical signals are extracted from the noises.

21. An apparatus for improving the performance of video cameras as defined in claim 18 wherein the means for improving the signal-to-noise ratio of the received signals comprises means for providing an aperture around the optical signals.

22. An apparatus for improving the performance of video cameras as defined in claim 18 wherein the means for improving the signal-to-noise ratio of the received signals comprises means for averaging a line in the video camera.

23. An apparatus for improving the performance of video cameras as defined in claim 18 wherein the means for improving the signal-to-noise ratio of the received signals comprises means for averaging an area in the camera.

24. An apparatus for improving the performance of video cameras as defined in claim 14 wherein the video camera comprises a CCD camera.

25. An apparatus for improving the performance of video cameras as defined in claim 14 wherein the camera comprises a vidicon camera.

26. An apparatus for improving the performance of video cameras as defined in claim 14 further comprising a digital processor configured for calculating parameters of a laser beam.

27. A method for improving the performance of video cameras used for making dimensional measurements in conjunction with a digitizer having a zero baseline, the dimensional measurements being made in accordance with received optical signals, the method comprising the steps of:
blocking all optical signals from reaching the camera;
adjusting the zero baseline of a signal output by the camera such that all noises are represented by positive counts output from the digitizer and such that a baseline signal is produced;
averaging a plurality of frames containing the baseline signal to obtain a reference frame;

allowing the optical signals to reach the camera and generating subsequent digitized frames;

subtracting the reference frame from subsequent digitized frames to correct for baseline offset, shading, and fixed patterns in pixel offsets deficiencies in the video camera and such that no received optical signals components are lost; and improving the signal-to-noise ratio of the signal output from the video camera.

28. A method for improving the performance of video cameras used for making linear dimensional measurements in conjunction with a digitizer having a baseline, the dimensional measurements being made in accordance with received optical signals, the method comprising the steps of:

adjusting the baseline of a signal output by the camera such that all noises are represented by positive counts and the mean of the baseline is centered at a predetermined positive digital integer count to arrive at a baseline offset value; and subtracting the baseline offset value from subsequent frames to correct for baseline error while maintaining both positive and negative signals from the subtraction process such that no components of the received optical signals are lost.

29. A method for improving the performance of video cameras as defined in claim 28 further comprising the step improving the signal-to-noise ratio of the signal output from the camera.

30. An apparatus for improving the performance of video cameras used for making spatial measurements, the video camera providing a received signal comprising noises and optical signals, the apparatus comprising:

means for acquiring the received signal from the video camera;

means for digitizing the optical signals contained in the received signal;

means for adjusting the baseline of the received signal such that all noises are represented by positive counts and the mean of the baseline is centered at a predetermined positive digital count to arrive at a baseline offset; and means for subtracting the baseline offset from subsequent frames to correct for baseline error such that both positive and negative signals are maintained while being processed so that substantially none of the components of the optical signals are lost.

31. An apparatus for improving the performance of video cameras as defined in claim 30 further comprising means for improving the signal-to-noise ratio of the received signal.

* * * * *